United States Patent
Dutta et al.

[11] Patent Number: 5,126,166
[45] Date of Patent: Jun. 30, 1992

[54] METHOD OF REDUCING THE DEGRADATION OF THE RED PHOSPHOR, Y2O3:EU, IN WATER BASE LAMP SUSPENSIONS

[75] Inventors: Arunava Dutta, Chestnut Hill; Ernest A. Dale, Hamilton; Leonard V. Dullea, Peabody, all of Mass.

[73] Assignee: GTE Products Corporation, Danvers, Mass.

[21] Appl. No.: 632,459

[22] Filed: Dec. 21, 1990

[51] Int. Cl.$^5$ ............................ B05D 5/06; B05D 7/00
[52] U.S. Cl. .......................................... 427/67; 427/64; 427/215; 313/489
[58] Field of Search ................... 427/64, 69, 67, 68, 427/215; 313/489; 428/403, 405

[56] References Cited

U.S. PATENT DOCUMENTS

| | | | |
|---|---|---|---|
| 4,287,229 | 9/1981 | Watanable et al. | 427/64 |
| 4,585,673 | 4/1986 | Sigai | 427/213 |
| 4,803,400 | 2/1989 | Peters et al. | 313/489 |
| 4,952,422 | 8/1990 | Pappalardo et al. | 427/67 |
| 5,049,408 | 9/1991 | Klinedinst et al. | 427/69 |

OTHER PUBLICATIONS

Kotrly and Sucho, Handbook of Chemical Equilibria In Analytical Chemistry, Ellis Horwood, 1985.
Butler, Fluoresent Lamp Phosphors, Technology and Theory, Penn State University Press (1980).
C. Pantano, "Oxynitride Thin Films from the Sol-Gel Process," Sol-Gel Technology for Thin Films, Fibers, Preporms, Electronics and Specialty Shapes, edited by Lisa C. Klein, Noyes Publications, 1988.

Primary Examiner—Michael Lusignan
Assistant Examiner—Roy V. King
Attorney, Agent, or Firm—Martha Ann Finnegan; Robert E. Walter

[57] ABSTRACT

A method has been found which reduces substantially the degradation of the red phosphor, $Y_2O_3$:Eu, in water base fluorescent lamp suspension, thereby prolonging the shelf life of triphosphor suspensions. The method of the invention comprises forming a protective coating around individual particles of europium-doped yttrium oxide phosphor to inhibit degradation of europium-doped yttrium oxide phosphor in a water base phosphor coating suspension, the protective coating comprising an inorganic material and being of sufficient thickness to prevent the europium-doped yttrium oxide phosphor from reacting with the coating suspension. A preferred coating material is gamma-alumina.

2 Claims, 5 Drawing Sheets

METHOD OF REDUCING THE DEGRADATION OF THE RED PHOSPHOR, Y2O3:EU, IN WATER BASE LAMP SUSPENSIONS

TECHNICAL FIELD OF THE INVENTION

This invention relates to phosphors and more particularly to water base suspensions of phosphors.

BACKGROUND OF THE INVENTION

In the fabrication of fluorescent lamps, a phosphor layer is applied to the interior surface of a glass envelope using a water base or organic base suspension of phosphor powder. Environmental considerations favor the use of an aqueous system. The phosphor layer may be applied directly to the glass or may alternatively be applied to a previously applied coating, of, for example, phosphor or reflective material.

Although the composition of the phosphor coating suspension may vary from lamp manufacturer to lamp manufacturer, the suspension usually includes, in addition to the phosphor, a film forming binder, solvent(s) for the binder, and, if necessary, surfactants, defoamers, and wetting agents. The coating suspension may further include submicron particle size alumina, e.g., Aluminum Oxide C (ALON C).

Many of the non-phosphor components of the coating suspension interfere with efficient lamp operation and longevity, and are therefore removed from the phosphor coating during the manufacturing process by high temperature oxidation in air, a manufacturing step known in the art as "lehring."

The submicron particle size alumina is not removed during the lehring step. The submicron particle size alumina assists in the formation of a uniform adherent phosphor layer on the lamp surface.

Butler, in his book, *Fluorescent Lamp Phosphors, Technology and Theory*, Penn State University Press (1980), described lamp coating technology and its evolution from the nitrocellulose and ethylcellulose-type lacquers to the newer polymeric binders used with water base suspension systems.

Depending upon the chemical composition of the phosphor and method of preparation, phosphors may exhibit some differences in performance depending upon whether a water base or organic base suspension is used to apply the phosphor coating to the bulb. Usually these differences are not significant unless the phosphor has a tendency to react chemically with one of the suspension components.

SUMMARY OF THE INVENTION

In fabricating fluorescent lamps including europium-doped yttrium oxide ($Y_2O_3$:Eu) phosphor, wherein the europium-doped yttrium oxide phosphor is applied to the lamp from a water base coating suspension system, it has been observed that, the phosphor layer has an unacceptable, non-white body color after the lehring step.

In accordance with the present invention, it has been found that the unacceptable body color of the phosphor coating including europium-doped yttrium oxide ($Y_2O_3$:Eu) phosphor is due to degradation of the europium-doped yttrium oxide ($Y_2O_3$:Eu) phosphor in the water base coating suspension due to solubility of this phosphor and/or crystallite breakup in an aqueous medium.

In accordance with the present invention, a method which reduces degradation of the red phosphor, $Y_2O_3$:Eu, in water base phosphor coating suspensions has also been found, thereby prolonging the shelf life of the coating suspensions.

The method of the invention comprises forming a protective coating around individual particles of europium-doped yttrium oxide phosphor to inhibit degradation of europium-doped yttrium oxide phosphor in a water base phosphor coating suspension, the protective coating being of sufficient thickness to prevent the europium-doped yttrium oxide phosphor from reacting with the coating suspension. The protective coating can be any material which has a very low solubility, i.e., less than 0.0001 grams/cc when measured at 25° C. over a pH range of 6 to 10 in the coating suspension, and which is optically transparent to both UV radiation (254 nm and 185 nm) in the finished lamp and the visible radiation emitted by the $Y_2O_3$:Eu red phosphor (611nm).

A preferred protective coating comprises alumina.

Figure 1:
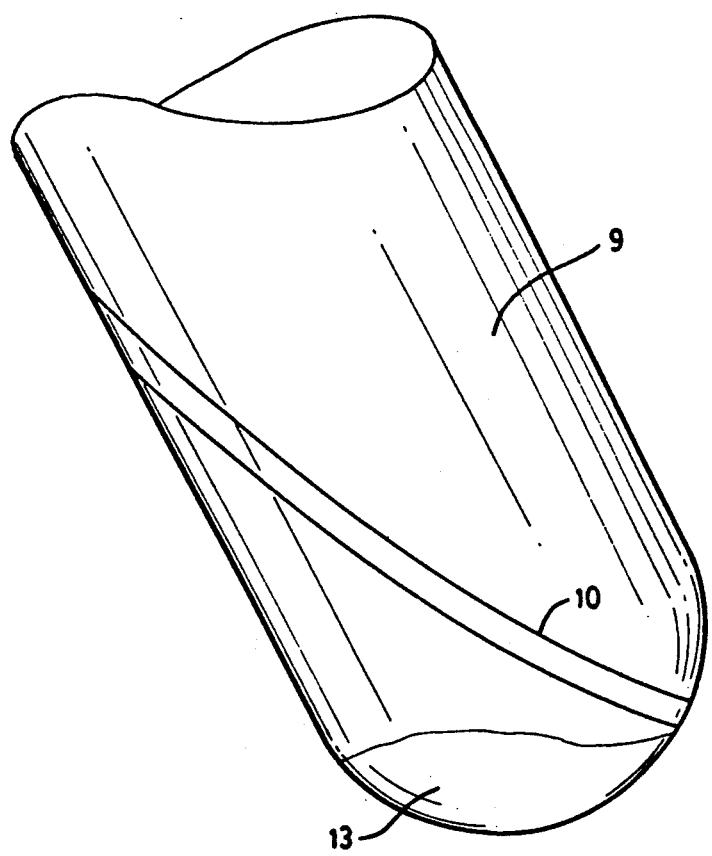
FIG. 1 illustrates the various phases of a sample of a coating suspension including $Y_2O_3$:Eu (without a protective coating) which has been centrifuged at 10,000 rpm for 30 minutes.

For a better understanding of the present invention, together with other and further advantages and capabilities thereof, reference is made to the following disclosure and appended claims in connection with the above-described drawings.

DETAILED DESCRIPTION OF THE PREFERRED EMBODIMENTS

As discussed above, it has been found that the red phosphor, $Y_2O_3$:Eu, undergoes degradation in a water base phosphor coating suspension system.

The degradation is caused by dissolution of the europium-doped yttrium oxide phosphor in the suspension system and/or breakup of the phosphor, which is a multicrystallite material, into smaller particle size material.

Phosphor solubility leads to transport of yttrium (and europium) in the form of various ions, from the phosphor to the liquid phase. The extent of this solubility increases dramatically as the pH of the phosphor suspension decreases. The decrease in pH is due to the need for the addition of certain necessary components, like ALON C, manufactured by Degussa, to the suspension.

ALON C behaves as an acid during the initial stage of its dispersion in a water base suspension. Addition of 3 grams of the ALON C to 100 cc of water at an initial pH of 7, drops the pH very rapidly to 5.1. Addition of silver nitrate to the suspension liquid phase, after centrifugation, yields a white precipitate indicating the presence of chloride ions in the liquid. The acidity is possibly due to the presence of one or more of the following species on the surface and/or in the bulk: aluminum chloride, aluminum oxychloride, etc. The first named material, i.e., aluminum chloride, is used in the manufacture of ALON C. chemical analysis on a typical lot of ALON C reveals about 100 ppm Cl in the material.

Subsequent rise of the suspension pH, due to the inherent basic nature of yttrium oxide, leads to precipitation of various ions of yttrium (and europium) in the form of a scum on the surface of the phosphor particles. In addition to creating dispersion problems, this scum also causes an unacceptable loss in lumens due to lamp bakeout problems.

Dissolution of europium-doped yttrium oxide causes further concerns when it is used as a component of a blend including two or more different phosphors.

For example, a triphosphor blend is a mixture of a red phosphor, a green phosphor, and a blue phosphor formulated to produce white light when used in a fluorescent lamp.

Phosphor blends including two phosphors, e.g., $Y_2O_3$:Eu and another phosphor, are also used in fluorescent lamps.

When the red europium-doped yttrium oxide phosphor component of a triphosphor blend dissolves in the coating suspension, the formulation of the blend is changed, thus requiring additional amounts of the red phosphor to be added to the suspension to replace the red phosphor that has dissolved and correct the color imbalance caused by such dissolution.

Furthermore, the red phosphor, $Y_2O_3$:Eu, is usually a multicrystallite material. Addition of this phosphor to an aqueous medium results in etching of the material along grain boundaries, leading to a decrease in particle size with time. This decrease in particle size causes two problems. The accompanying increase in powder surface area increases the rate of dissolution of the phosphor at any pH. In addition, the breakdown of the red phosphor particles into smaller particle size material widens the difference in particle size between the red and green phosphors in the triphosphor suspension, since the green component does not suffer this degradation. The difference in particle sizes of the red and green components of the triphosphor blend results in separation of the components along the length of the lamp envelope during the coating process, causing visually detectable color variation along the length of the lamp during lamp operation.

Experiments Involving Degraded Water Base Phosphor Suspensions Including $Y_2O_3$:Eu The following experiments were conducted on a lot of a triphosphor suspension which needed an additional 51% red phosphor (% by mass of total initial phosphor) to bring the suspension to color specifications. A sample of the suspension was centrifuged at 10,000 rpm for 30 minutes. FIG. 1 schematically shows the breakdown of the suspension sample after centrifugation. The centrifugation gave rise to an upper liquid phase 9 at the bottom of which was a thin mocha colored solids layer 10 below which lay a white solids mass 13, the phosphor. The intermediate layer of thin colored solids 10 is referred to herein as the "scum layer." The breakdown shown in FIGURE 1 was observed under 253.7 nm radiation. The scum layer does not display any fluorescent under 254 nm or 365 nm radiation.

The scum layer material was dried and its thermal decomposition studied. The major weight loss occurs by about 300° C. and is about 76.2% of the initial mass. The scum has a long thermal tail, losing an additional 3% of initial mass over the next 700° which puts the temperature well beyond the range of most lamp furnaces. This leads to the lamp bakeout problem referred to earlier: non-white body color of the phosphor layer and an accompanying loss in lamp brightness.

The dried material gave no diffraction pattern, indicating that the scum layer is amorphous as formed, but X-ray diffraction conducted after heating at about 1000° C. for 20 minutes in air confirmed the presence of yttrium. A sample of the scum was ignited to 800° C., resulting in a white, dense solid which was weighed and analyzed for yttrium. About 38% of the material is yttrium oxide.

Decrease in Particle Size of Red Phosphor in an Aqueous Medium

Dissolution of the red phosphor and multicrystallite breakup leads to a reduction in particle size of the phosphor.

A dispersion of GTE phosphor 2345 Lot YCX681 was made in deionized water, the phosphor concentration being 20 wt% of the suspension. Initial pH of the deionized water was 5.3. The sample was held over for 2400 hours, after which particle size measurements were made on a Malvern 3600Ec laser diffraction system. Ultrasound was used at the 100% level for 15 minutes before particle size measurement, and at the 70% level during measurement of the same. Three independent runs were made on the Malvern apparatus. A control sample of the phosphor which did not undergo any water base holdover was also measured in the same manner. Table I shows the effect of water base holdover on the particle size of the red phosphor. The decrease in particle size of the phosphor at every single volume % (90, 50, and 10) is clearly evident. The 90% size decreased from 11.3 microns to 7.67 microns, the 50% size reduced from 5.1 microns to 3.6 microns and the 10% size changed from 0.94 to 0.67 microns. A decrease in particle size should be accompanied by an increase in the specific surface area. This is also evident in Table I, in an increase from 2.98m²/cc for the no holdover sample to 3.83 m²/cc for the water base holdover phosphor.

TABLE I

| EFFECT OF HOLDOVER ON 2345 PSD | | | | | |
|---|---|---|---|---|---|
| A | | | | | |
| $D(v, 0.5) =$ | 5.10 μg | $D(v, 0.5) =$ | 5.13 μg | $D(v, 0.5) =$ | 5.00 μg |
| $D(v, 0.9) =$ | 11.29 μg | $D(v, 0.9) =$ | 11.44 μg | $D(v, 0.9) =$ | 11.14 μg |
| $D(v, 0.1) =$ | 0.94 μg | $D(v, 0.1) =$ | 0.95 μg | $D(v, 0.1) =$ | 0.92 μg |
| $D(4, 3) =$ | 5.66 μg | $D(4, 3) =$ | 5.71 μg | $D(4, 3) =$ | 5.60 μg |
| $D(3, 2) =$ | 2.55 μg | $D(3, 2) =$ | 2.57 μg | $D(3, 2) =$ | 2.53 μg |
| Span = | 2.0 | Span = | 2.0 | Span = | 2.0 |
| Spec. surf. area 2.9852 sq.s./cc. | | Spec. surf. area 2.9657 sq.s./cc. | | Spec. surf. area 3.0115 sq.s./cc. | |

TABLE I-continued
EFFECT OF HOLDOVER ON 2345 PSD

B

| | | |
|---|---|---|
| D(v, 0.5) = 3.66 μg | D(v, 0.5) = 3.55 μg | D(v, 0.5) = 3.59 μg |
| D(v, 0.9) = 7.65 μg | D(v, 0.9) = 7.50 μg | D(v, 0.9) = 7.87 μg |
| D(v, 0.1) = 0.69 μg | D(v, 0.1) = 0.66 μg | D(v, 0.1) = 0.67 μg |
| D(4, 3) = 3.93 μg | D(4, 3) = 3.82 μg | D(4, 3) = 3.94 μg |
| D(3, 2) = 1.92 μg | D(3, 2) = 1.86 μg | D(3, 2) = 1.88 μg |
| Span = 1.9 | Span = 1.9 | Span = 2.0 |
| Spec. surf. area 3.7832 sq.s./cc. | Spec. surf. area 3.8829 sq.s./cc. | Spec. surf. area 3.8410 sq.s./cc. |

A - No Holdover
B - 20 wt % Phosphor; 2400 Hour Holdover
Phosphor used: Type 2345, Lot-YCX 681

Solubility of the Red Phosphor: A Thermodynamic Study

The conversion of yttrium oxide, in the presence of water, to yttrium hydroxide, is characterized by a negative $\Delta G$ of reaction. It is, therefore, appropriate to investigate the thermodynamics of yttrium hydroxide solubility in order to study the solubility of the red phosphor.

The following equilibria are considered between yttrium hydroxide in the solid phase, denoted by $Y(OH)_3(s)$, and seven different yttrium ions in solution. Of these seven ions, five are mononuclear and the balance are polynuclear in yttrium.

MONONUCLEAR COMPLEXES OF YTTRIUM

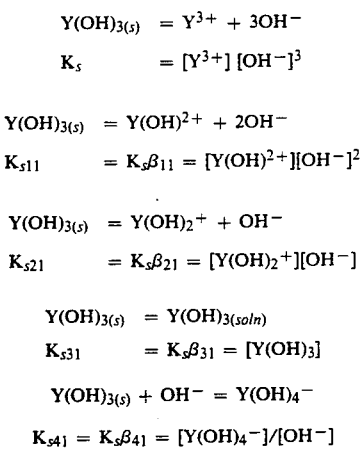

1. $Y(OH)_{3(s)} = Y^{3+} + 3OH^-$
   $K_s = [Y^{3+}][OH^-]^3$

2. $Y(OH)_{3(s)} = Y(OH)^{2+} + 2OH^-$
   $K_{s11} = K_s\beta_{11} = [Y(OH)^{2+}][OH^-]^2$ 3. $Y(OH)_{3(s)} = Y(OH)_2^+ + OH^-$
   $K_{s21} = K_s\beta_{21} = [Y(OH)_2^+][OH^-]$ 4. $Y(OH)_{3(s)} = Y(OH)_{3(soln)}$
   $K_{s31} = K_s\beta_{31} = [Y(OH)_3]$ 5. $Y(OH)_{3(s)} + OH^- = Y(OH)_4^-$
   $K_{s41} = K_s\beta_{41} = [Y(OH)_4^-]/[OH^-]$

POLYNUCLEAR COMPLEXES OF YTTRIUM

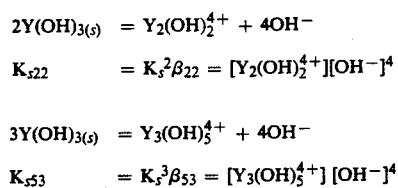

6. $2Y(OH)_{3(s)} = Y_2(OH)_2^{4+} + 4OH^-$
   $K_{s22} = K_s^2\beta_{22} = [Y_2(OH)_2^{4+}][OH^-]^4$ 7. $3Y(OH)_{3(s)} = Y_3(OH)_5^{4+} + 4OH^-$
   $K_{s53} = K_s^3\beta_{53} = [Y_3(OH)_5^{4+}][OH^-]^4$ In the above reactions $K_s$ is the solubility product for $Y(OH)_3$ and $\beta_{ba}$ is the stability constant for the complex $M_aA_b$. The complex formation of the species $M_mA_n$ may be represented by the general equation (Kotrly and Sucha, Handbook of Chemical Equilibria in Analytical Chemistry, Ellis Horwood, 985):

$$a/m\, M_mA_{n(s)} = M_aA_{b(soln)} + (an/m - b)A$$

where $K_{sba} = \beta_{ba}K_s^{a/m}$

It follows that for reaction 6, $m = 1$, $n = 3$. $a = 2$ $b = 2$, $M = Y$ and $A = OH$.

Similarly, the reaction 7, $m = 1$, $n = 3$, $a = 3$ and $b = 5$.

The stability constants $\beta_{ba}$ are defined as follows:

$$\beta_{11} = [Y(OH)^{2+}]/[Y^{3+}][OH^-]$$
$$\beta_{21} = [Y(OH)_2^+]/[Y^{3+}][OH^-]^2$$
$$\beta_{31} = [Y(OH)_3]/[Y^{3+}][OH^-]^3$$
$$\beta_{41} = [Y(OH)_4^-]/[Y^{3+}][OH^-]^4$$
$$\beta_{22} = [Y_2(OH)_2^{4+}]/[Y^{3+}]^2[OH^-]^2$$
$$\beta_{53} = [Y_3(OH)_5^{4+}]/[Y^{3+}]^3[OH^-]^5$$

The values for $\log \beta$ are obtained from Kotrly and Sucha as:

$\beta_{11} = 6.3$, $\beta_{21} = 11.6$, $\beta_{31} = 16.0$, $\beta_{41} = 19.5$, $\beta_{22} = 13,8$ and $\beta_{53} = 38.4$.

The solubility product for $Y(OH)_3$ is given in the same reference as, $pK_2 = 23.2$.

The following thermodynamic equations, which describe the solubility of the various yttrium ions as a function of pH, can be derived from the above information:

| | |
|---|---|
| $\log[Y^{3+}] = 18.8 - 3pH$ | 1 |
| $\log[Y(OH)^{2+}] = 11.1 - 2pH$ | 2 |
| $\log[Y(OH)_2^+] = 2.4 - pH$ | 3 |
| $\log[Y(OH)_3] = -7.2$ | 4 |
| $\log[Y(OH)_4^-] = pH - 17.7$ | 5 |
| $\log[Y_2(OH)_2^{4+}] = 23.4 - 4pH$ | 6 |
| $\log[Y_3(OH)_5^{4+}] = 24.8 - 4pH$ | 7 |

Figure 2:
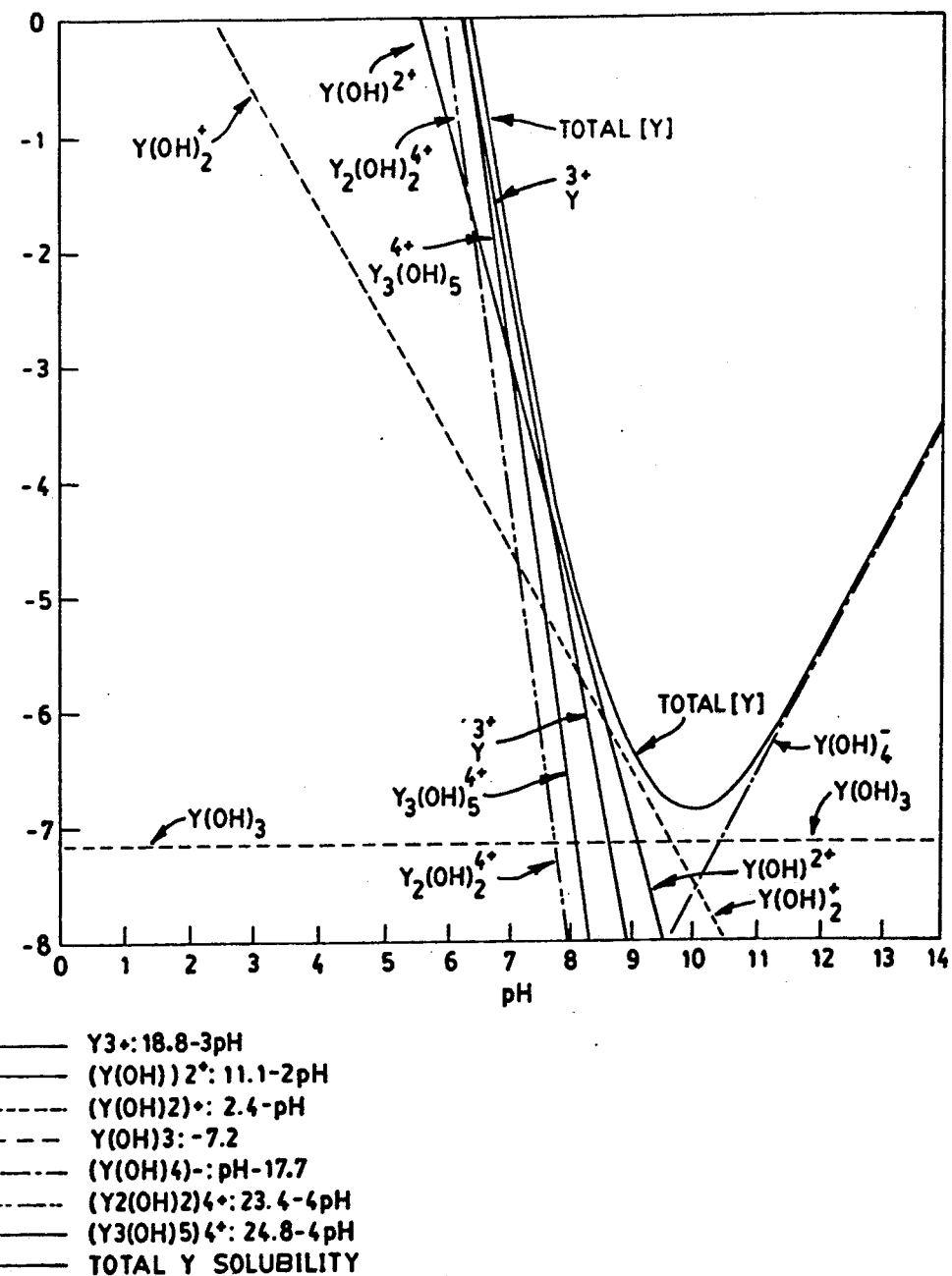
FIG. 2 graphically illustrates the solubility of yttrium hydroxide in water at 25° C. and ionic strength of zero.

A graphic representation of the solubilities of these seven species is shown in FIG. 2. The ordinate of the graphy is log[Y], and the concentrations of the polynuclear species are multiplied by the appropriate factors to reflect this. For example, one mole of $Y_2(OH)_2^{4+}$ contains two moles of Y. The multiplication factor to obtain [Y] for this species is, therefore, 2. FIG. 2 also shows the total solubility of Y, computed from a summation of the seven species' solubilities. A minimum in the Y solubility is predicted at a pH of about 10.

Results from this study were used to predict the effect of pH on the dissolution of the red phosphor, $Y_2O_3$:Eu. A typical red phosphor containing 2.62 wt% europium was considered. A standard concentration of 120g of the red phosphor per liter of water was studied.

Figure 3:
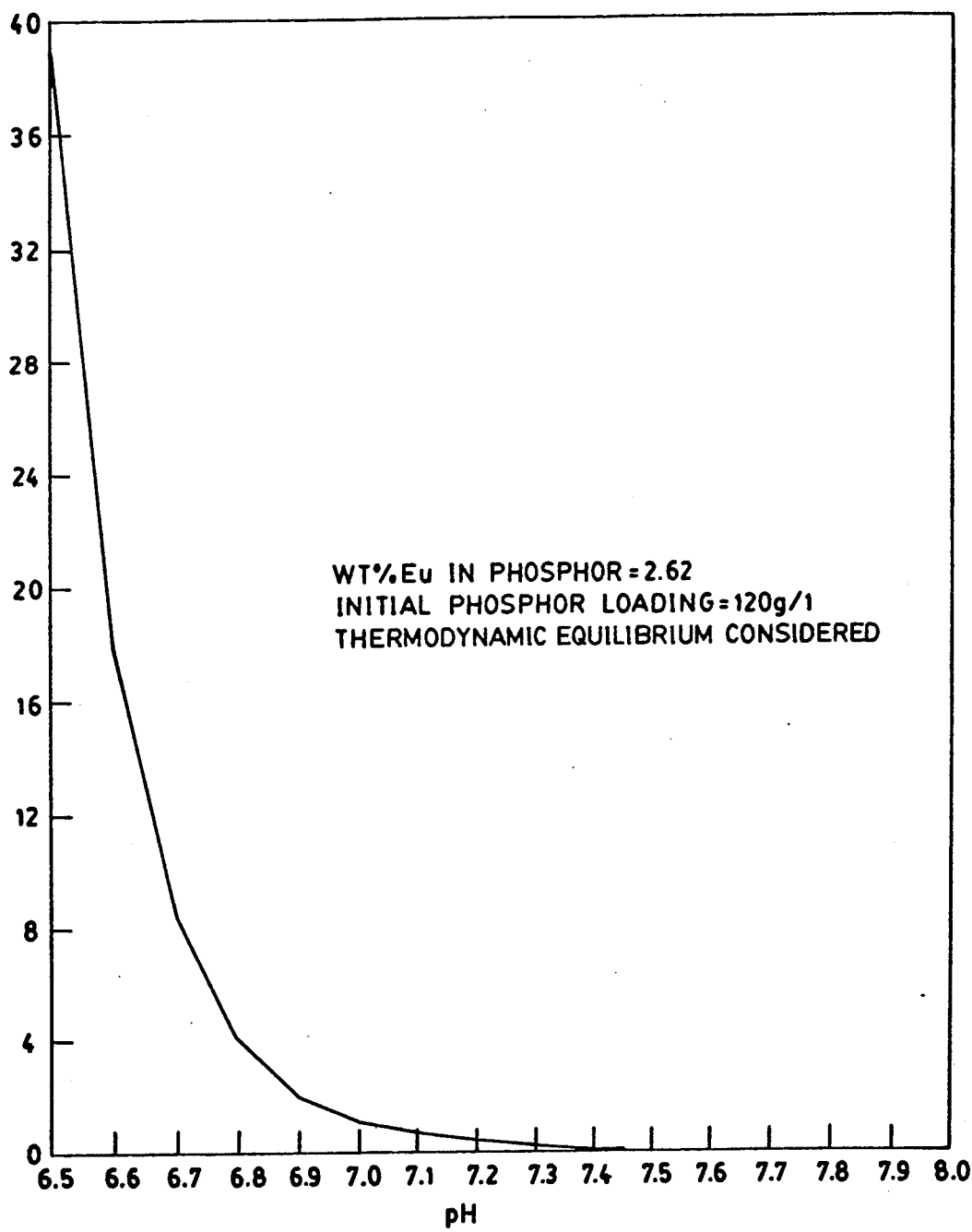
FIG. 3 graphically illustrates the effect of pH on dissolution of $Y_2O_3$:Eu phosphor in water at 25° C.

FIG. 3 quantifies the adverse effects of low pH on the solubility of this phosphor. If the pH drops from the basic side to about 6.5, for example, almost 39% of the yttrium in the phosphor will have dissolved. The drop in pH can easily be brought about by the need to add ALON C, whose acidic nature has been discussed in an earlier section. It also follows that a significant amount of the dissolved yttrium will precipitate out as undesired scum on the surface of the phosphor particles when the suspension pH subsequently rises. This rise in suspension pH, as has been mentioned earlier, is due to the inherent basic nature of the red phosphor.

Solubility of Alumina: A Thermodynamic Study

A thermodynamic study, similar to that carried out for yttrium hydroxide, was carried out for aluminum hydroxide.

Figure 4:
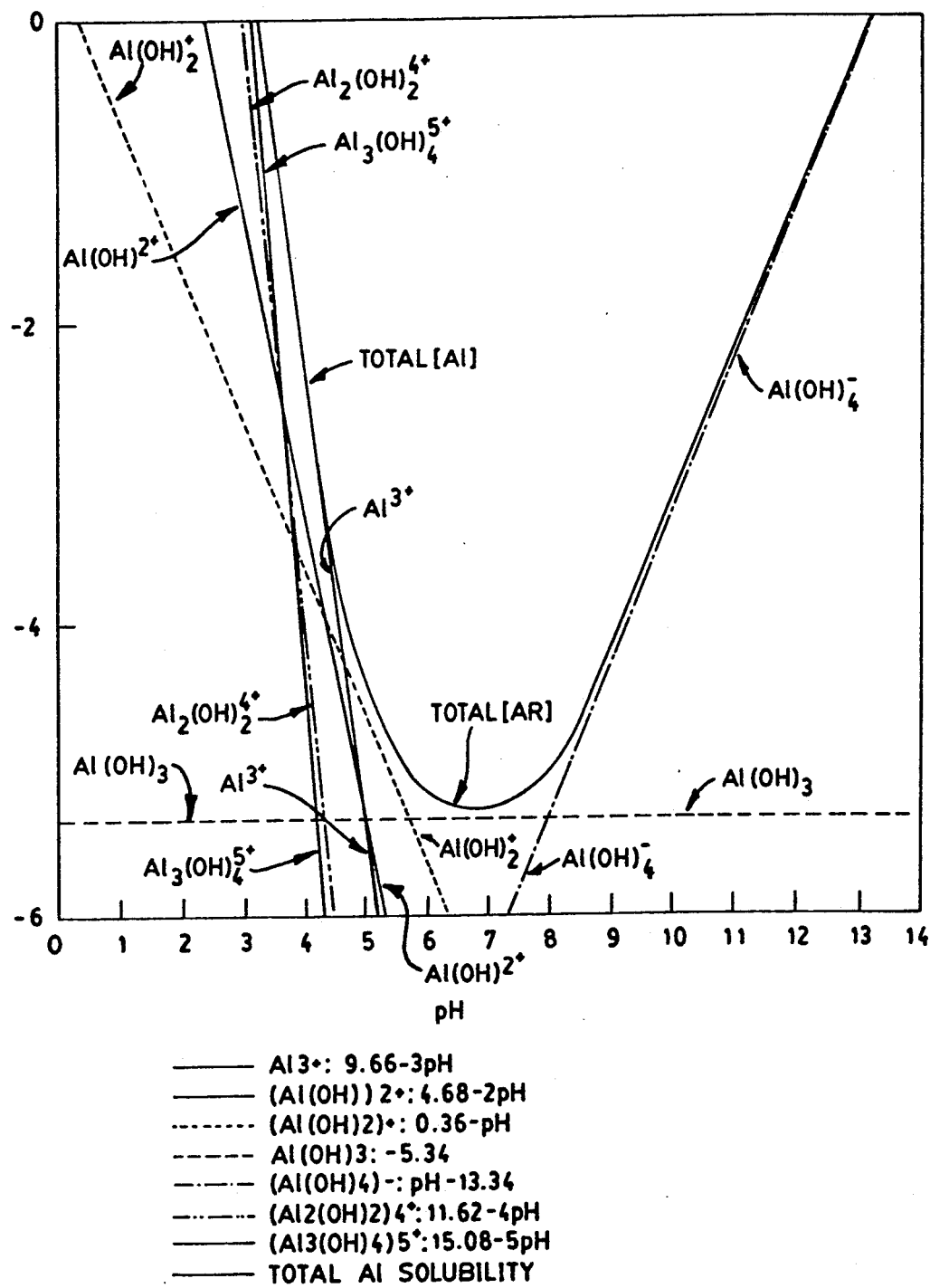
FIG. 4 graphically illustrates the solubility of aluminum hydroxide in water at 25° C. and ionic strength of zero.

In a water base system, at room temperature, aluminum hydroxide is thermodynamically more stable than alumina. The solubility of aluminum hydroxide was investigated by studying the solubility of five mononuclear and two polynuclear species of aluminum. FIG. 4 shows a plot of these solubilities. The ordinate of the graph is log[Al], and the concentrations of the polynuclear species are multiplied by the appropriate factors to reflect this. FIG. 4 also shows the total solubility of Al, computed from a summation of the seven component solubilities. A minimum in the total Al solubility occurs at a pH of about 7.

Efficacy of Alumina Coating on Red Phosphor

It is clear from a comparison of FIGS. 2 and 4 that in the range of pH of about 6 to 8 where yttrium hydroxide has a very high solubility, aluminum hydroxide has a much lower solubility. Thus coating of the red phosphor with a material like alumina will minimize dissolution over this range of suspension pH, thereby eliminating the severe problems associated with red phosphor going into solution.

A sample of red europium-doped yttrium oxide phosphor, GTE Type 2342, lot YCX121, manufactured by the Chemical and Metallurgical Division of GTE Products Corporation, Towanda, Pa., was held over in water for 96 hours.

A sample of 15 kg of the same phosphor lot was coated with a conformal coating of alumina as follows:

Approximately 15 kg grams of red europium-doped yttrium oxide phosphor GTE Type 2342, lot YCX121, was mixed with 15 grams Aluminum Oxide C, available from Degussa, Inc. (0.1% by weight), and was loaded into a fluid bed, and the individual particles of the phosphor were encapsulated in a conformal coating of aluminum oxide by a method similar to that described in the following Specific Example.

Subsequent to coating, the coated phosphor was annealed as described in U.S. Pat. No. 4,803,400 of Thomas E. Peters et al., issued Feb. 7, 1989, and assigned to GTE Laboratories Incorporated, the disclosure of which is hereby incorporated herein by reference.

While the coating method described in the Specific Example is preferred, variations of such method can also be used. See, for example, U.S. Pat. application Ser. No. 07/430,546 of Robin W. Munn, Dale E. Benjamin, A. Gary Sigai, and Silvia E. Lichtensteiger, entitled "METHOD FOR COATING PHOSPHOR PARTICLES," the disclosure of which is hereby incorporated herein by reference, and U.S. Pat. No. 4,585,673 of A. Gary Sigai, issued Apr. 29, 1986, and assigned to GTE Laboratories Incorporated, the disclosure of which is hereby incorporated herein by reference.

SPECIFIC EXAMPLE

Figure 5:
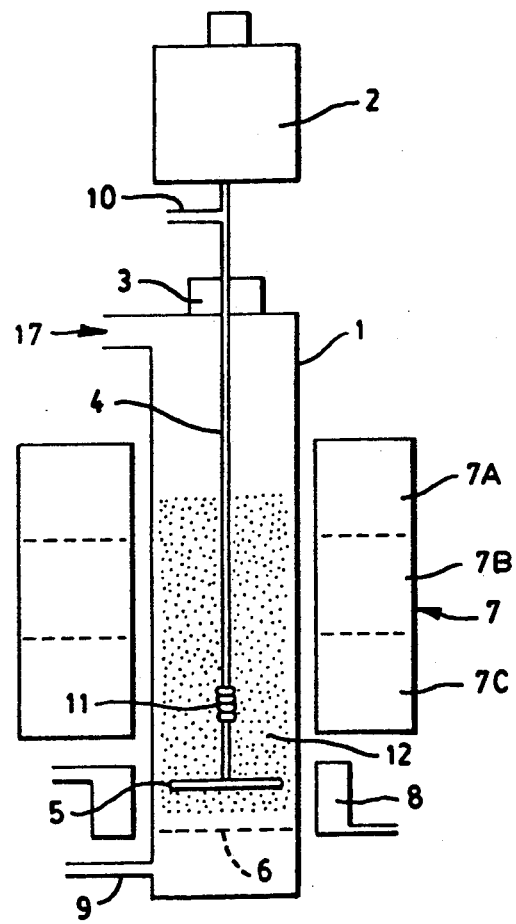
FIG. 5 schematically illustrates an example of a fluid bed reactor useful in carrying out the method of the invention.

A fluid bed reactor, as shown in FIG. 5, was used to apply an alumina coating to the phosphor particles. The fluid bed reactor includes an approximately 4 in ID by 5 ft tall transparent quartz tube for the vessel 1. The reactor includes a vibrator 2 and an agitator 5 to stimulate and control the motion of the phosphor in the fluid bed. The vibrator 2 is a VIBRO-MIXER unit, Model E-2, obtained from CHEMAP, INC., along with the standard gas seal 3. The VIBRO-MIXER is equipped with a rheostat so that the vertical amplitude of the agitator 5 can be adjusted from zero to the maximum 3 mm. For the agitator shaft 4, the VIBRO-MIXER is fitted with a piece of steel tubing long enough so that the agitator 5 is approximately three inches above the porous metal gas distributor plate 6. The fifteen ¼ in. holes regularly spaced throughout the interior of the disk. The circular holes taper outwardly from a top opening. A portion of the length of the quartz tube is surrounded by a split-tube furnace 7 to provide indirect heat to the fluid bed. The furnace contains three zones of heating, each 12-in. long. (Approximately 20–24" inches of the fluid bed column extended from the bottom of the furnace.) In this test, only the top two zones were utilized while the bottom zone was turned off. The top of the three-zone furnace is about 150 cm above the distributor plate. An external water cooling coil 8, installed at the bottom of the vessel from the distributor plate 6 to about an inch above the agitator disk 5, was not used. Nitrogen is passed through a bubbler vessel containing the protective coating precursor material, in this example, trimethyl aluminum (TAA). The resultant vapor-containing gas stream is diluted with additional pure nitrogen and then introduced to the reactor through connection 9. Also, oxygen is hooked to the agitator shaft at connection 10 and injected directly into the bed via a porous metal sparger 11.

The temperature of the bed located within the furnace is about 425° C. Nitrogen at 6.5 slm flows through a TMA bubbler, maintained at about 50° C. Makeup $N_2$ is added to the gas/vapor stream exiting the bubbler; the amount of the makeup is 20 slm. Oxygen is introduced into the reactor at two locations, one at 25.4 cm and the other at 50.5 cm above the distributor plate. The total oxygen flow rate is 16.5 slm. A typical coating run lasts for about 4 hours.

After being the coated red phosphor was removed from the fluid bed reactor and allowed to cool, the cooled coated phosphor was heated in air for four hours at a temperature of 780° C.

After the phosphor was encapsulated by a conformal coating of aluminum oxide having an approximate thickness of 250 Angstroms, and annealed, 100 grams of the coated phosphor was held over in 100cc distilled water for 96 hours. The concentration, 50 wt%, of phosphor in the suspension, was identical in both the coated and uncoated cases. After the 96 hour hold over period, the suspension of the held-over uncoated europium-doped yttrium oxide and the suspension of the held-over aluminum oxide coated europium-doped yttrium oxide were filtered, and the filtrate analyzed for total Y concentration, [Y].

The [Y] for the uncoated sample was 3.6 ppm, while that for the coated sample was below detectable limits, or less than 0.05 ppm: a difference of about 2 orders of magnitude. This proves the efficacy of the alumina coating in minimizing the dissolution of the red phosphor, indicating that the degradation of the europium-doped yttrium oxide phosphur is dramatically reduced by applying a coating of aluminum oxide to the individual particles thereof, in accordance with the invention.

The Protective Coating

The coating should be sufficiently thick to prevent reaction between the europium-doped yttrium oxide phosphor and the water base coating suspension.

As stated above, the protective coating can be any material which has a very low solubility in the water base coating suspension. Preferably, the solubility of the protective coating material is less than 0.0001 grams/cc when measured at 25° C. over a pH range of 6 to 10.

The protective coating material is also preferably optically transparent to both UV radiation (254 nm and 185 nm) in the finished lamp and the visible radiation emitted by the $Y_2O_3$:Eu red phosphor (611nm).

Figure 6:
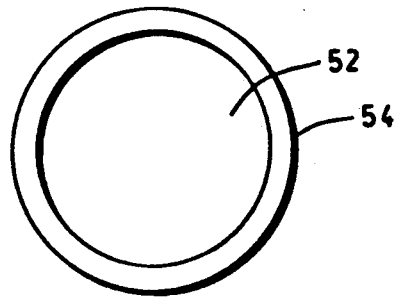
FIG. 6 schematically shows, in cross section, a phosphor particle encapsulated by a protective coating.

FIG. 6 schematically shows a particle of phosphor 52 surrounded by a protective coating 54, in cross section.

For purposes of being able to calculate the mass of the protective coating applied in accordance with the present invention, the phosphor particle 52 has a diameter, d, and a phosphor particle density, $\rho_p$. The protective coating has a thickness, t, a coating density, $\rho_c$, and a mass per unit mass of phosphor, $\alpha$.

Since $t/d \ll 1$, $$\alpha = [(1 + 2t/d)^3 - 1] \rho_c/\rho_p$$
$$\approx 6(t/d)(\rho_c/\rho_p)$$

Following is an example of a calculation of the mass of protective coating per mass of phosphor when the protective coating is alumina which has undergone annealing treatment For a protective coat of alumina $\rho_c$ 3.7 g/cc (after annealing).

$Y_2O_3$:Eu $\rho_p$ =5.0 g/cc

Typical d ≃5 microns =5 ×10$^{-6}$m

Typical t ≃250 Angstroms t/d =5 ×10$^{-3}$

Typical value for d=0.022 or 2.2% by mass of phosphor.

The protective coating applied in accordance with the invention is preferably a material which has a solubility of less than 0.0001 g/cc at 25° C. in an aqueous suspension having a pH between 6 and 10.

One example of a preferred coating material for use in the present invention is alumina. Alumina is preferred because Aluminum Oxide C is a component in most phosphor suspensions, and the alumina coating would form a more electrokinetically stable dispersion with the Aluminum Oxide C.

Most preferably, the coating material is about 2 to 2.5 wt% of the phosphor.

Besides alumina, other suitable coating materials include silicon oxynitride $SiO_xN_y$.

A protective coating of silicon oxynitride can be applied by nitridation in $NH_3$ of a sol-gel derived silica coating on the phosphor, the nitridation being carried out at about 900–1100° C. Sol-gel and nitridation techniques are well known in the art. See, for example, the description of a sol-gel process for the deposition of silica and subsequent nitridation by Pantano et al. ("Oxynitride Thin Films for the Sol-Gel Process", by Carlo pantano et al., in "Sol-Gel Technology for Thin Films, Fibers, Preforms, Electronics and Specialty Shapes", edited by Lisa Klein, Noyes Publications, 1988.)

The present invention also contemplates encapsulating europium-doped yttrium oxide with a protective coating comprising a plurality of layers wherein each layer need not be the same material, such as a protective coating comprising a layer of silica which is overcoated with a layer of alumina.

A coating comprising a plurality of layers of different materials is descried more fully in U.S. Pat. Application No. 07/468,432 of Keith Klinedinst, filed Jan. 22, 1990, now U.S. Pat. No. 5,051,277 and entitled, "Phosphors With Improved Lumen Output And Lamps Made Therefrom", the disclosure of which is hereby incorporated herein by reference.

While there has been shown and described what at present is considered a preferred embodiment of the invention, it will be apparent to those skilled in the art that various changes and modifications may be made herein without departing from the scope of the invention as defined by the appended claims.

What is claimed is:

1. A method of reducing the degradation of $Y_2O_3$:Eu phosphor in water base fluorescent lamp coating suspensions comprising: forming a protective coating around individual particles of europium-doped yttrium oxide phosphor to inhibit degradation of europium-doped yttrium oxide phosphor in a water base phosphor coating suspension, the protective coating comprising silicon oxynitride of sufficient thickness to prevent the europium-doped yttrium oxide phosphor from reacting with said water base phosphor coating suspension, said silicon oxynitride protective coating having a solubility in water of less than 0.0001 grams/cc at 25° C. at pH from about 6 to about 10.

2. A method of reducing the degradation of $Y_2O_3$:Eu phosphor in water base fluorescent lamp coating suspensions comprising: forming a protective coating around individual particles of europium-doped yttrium oxide phosphor to inhibit degradation of europium-doped yttrium oxide phosphor in a water base phosphor coating suspension, the protective coating comprising silicon oxynitride of sufficient thickness to prevent the europium-doped yttrium oxide suspension wherein said silicon oxynitride protective coating has a lower aqueous solubility than yttrium hydroxide over a range of pH from 6 to 10.

* * * * *